Dec. 22, 1942.  D. C. WEGNER  2,306,098
SAW SET
Filed June 11, 1942  2 Sheets-Sheet 1
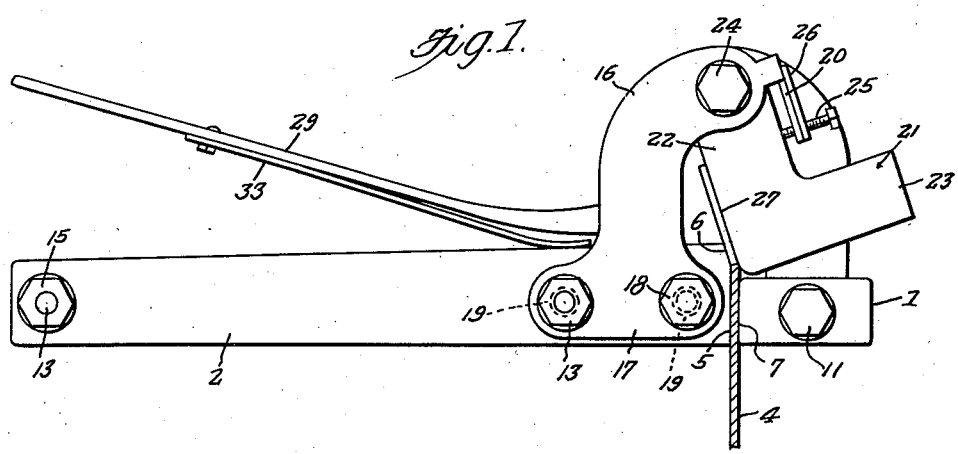
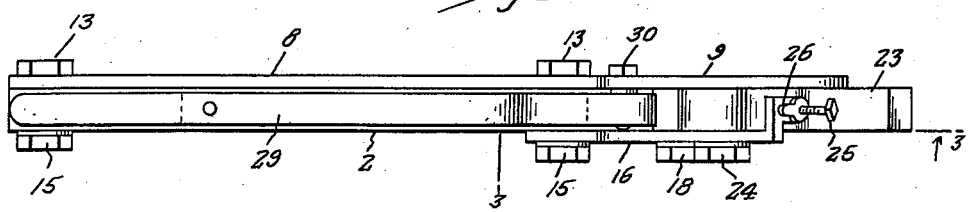
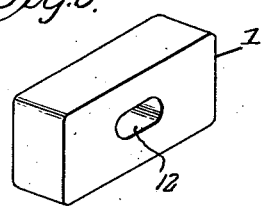
Inventor
Daniel C. Wegner
By Clarence A. O'Brien
and Harvey B. Jacobson
Attorneys Dec. 22, 1942.  D. C. WEGNER  2,306,098
SAW SET
Filed June 11, 1942   2 Sheets-Sheet 2
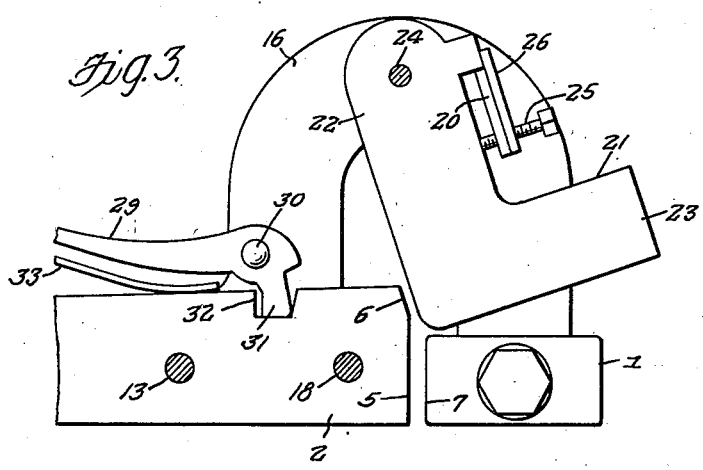
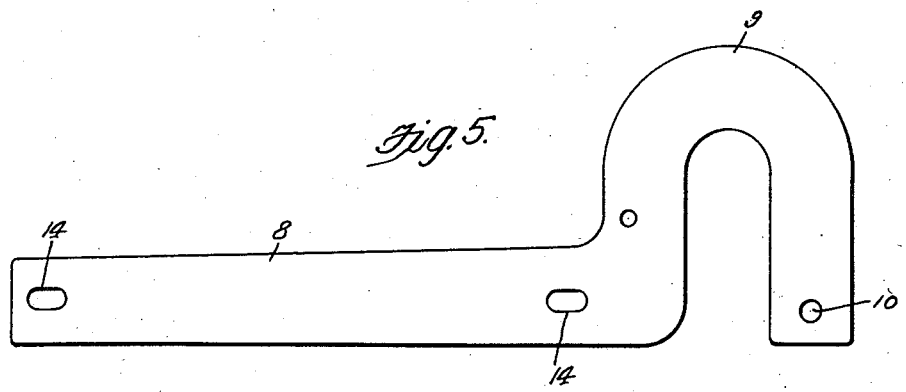
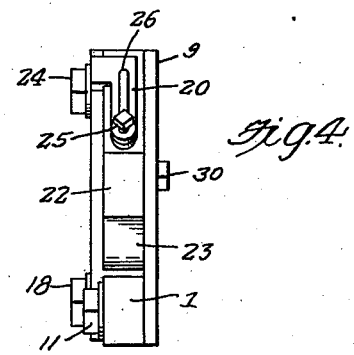
Inventor
Daniel C. Wegner
By Clarence A. O'Brien
and Harvey B. Jacobson
Attorneys Patented Dec. 22, 1942

2,306,098

UNITED STATES PATENT OFFICE 2,306,098

SAW SET

Daniel C. Wegner, Kamiah, Idaho, assignor of one-half to Jess C. Mathews, Kamiah, Idaho Application June 11, 1942, Serial No. 446,657

2 Claims. (Cl. 76—65)

My invention relates to improvements in saw sets for swaging the teeth of cross-cut saws.

The principal object of the invention is to provide a simply constructed, easily applied and operated device of the character indicated whereby the teeth of cross-cut saws, more particularly, may be quickly, accurately and uniformly set and which is adapted for easy adjustment to vary the setting as desired.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in side elevation of my improved saw set in its preferred embodiment, Figure 2 is a view in top plan, Figure 3 is a fragmentary view partly in side elevation and partly in section and taken on the line 3—3 of Figure 2 with the parts drawn to an enlarged scale, Figure 4 is a fragmentary view in front elevation, Figure 5 is a view in side elevation of the mounting for the clamping members, and Figure 6 is a view in perspective of one of the clamping members.

Reference being had to the drawings by numerals, in the preferred, illustrated embodiment thereof, my improved saw set comprises a pair of saw clamping members 1, 2, the member 1 having the form of a rectangular block, and the member 2 comprising an elongated, transversely rectangular bar 3. The members 1, 2 are mounted, as presently described, in end-to-end relation to clamp the saw 4 therebetween and to extend lengthwise horizontally from opposite sides thereof.

The clamping member 2 has a front end opposed to the member 1 and which provides a straight clamping face 5 at a right angle to the longitudinal axis of the member, and an upper corner anvil face 6 inclined with respect to the face 5 inwardly of the member.

The clamping member 1 has a clamping end face 7 opposed to the face 5 below the face 6.

A mounting for the clamping members 1, 2 is provided in the form of a carrier comprising a bar-like shank 8 extending along one side of the clamping member 2 and having a hook-like upstanding front end yoke 9 extending forwardly of the clamping member 2 with its terminal apertured, as at 10. The clamping member 1 is detachably secured to said terminal for endwise adjustment toward and from the clamping face 5 of the clamping member 2 in different set positions and by means of a screw bolt 11 passing through a longitudinal central slot 12 in the member 1 and turned into the aperture 10. The clamping member 2 is secured to the shank 8 for endwise sliding movement toward and from the clamping member 1 and by means of bolts 13 extending through said member 2 adjacent opposite ends thereof and through a pair of longitudinally extending slots 14 in the shank 8, said bolts being equipped with nuts 15.

A swage arm carrier is provided on the front end of the clamping member 2 and which comprises a bracket arm 16 upstanding from the side thereof opposite to that to which the shank 8 is opposed, and the upper end of which curves forwardly over the anvil face 6. The carrier has an enlarged base end 17 adapted to be clamped to the clamping member 2 by the front bolt 13 and nut 15 and in front of said bolt and nut by a clamping bolt 18. The bolts 13 and 18 extend through oversized apertures 19 in said base end 17 so that said carrier may be tilted forwardly and rearwardly for a purpose to be explained. A flat depending tongue 20 extends forwardly and downwardly from the upper end of the described carrier.

A right angled, flat, swage member 21 having an upstanding swage arm 22 and a forwardly projecting drive arm 23 depends from the upper end of the carrier and is pivoted at the free end of the swage arm 22 to said carrier, as at 24, for driving of a rear edge of the swage member 21 toward the anvil face 6.

A stop screw 25 threaded through the lower end of the tongue 20 to limit rebound of the swage member 21 by contact with the front edge of the arm 22 is provided for adjustment as required. A locking lever 26 is threaded at one end onto the screw 25 in front of the tongue 20 for turning against the latter to lock the screw 25. As will be seen, the rear edge 27 of the swage member 21 is inclined vertically in correspondence with the inclination of the anvil face 6.

For sliding the clamping member 2, a hand lever 29 is pivoted, as at 30, at its front end on the yoke 9 to overlie said clamping member, said lever having a front end, depending lug 31 working in a top edge slot 32 in said clamping member.

A suitably arranged leaf spring 33 urges the lever 29 upwardly so that the clamping member 2 is normally retracted from the clamping member 1.

The saw 4 is clamped between the faces 5, 7 of the clamping members 2, 1 by sliding the clamping member 2 forwardly through depression of the hand lever 29. The teeth of the saw, as shown in Figure 1, are swaged against the anvil face 6 by striking the driving arm 23 of the swage member 21 with a hammer or the like. By adjusting the swage arm carrier 16 on the bolts 13, 18 into different set positions, permitted by the oversize apertures 19, the relation of the rear edge 27 of the swage member 21 to the anvil face 6 may be varied to vary the angle at which the teeth are set. By similarly adjusting the said swage member carrier vertically the swage member 21 may be correspondingly adjusted to provide for impact against the teeth of the saw 4 at different distances from the root of the teeth to further vary the swaging or setting operation. The clamping member 1 is adjustable to take up wear.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. A saw set comprising a carrier including an elongated flat sided shank terminating at one end in a hook-shaped yoke adapted to straddle a saw, a block-like clamping member secured to the terminal end of said yoke alongside the same, and having a flat end for engagement with one side of the saw, a second clamping member comprising a bar opposed to said shank parallel therewith and having a front end for engagement with the other side of the saw and an upper oblique anvil forming face at said end, means to slidably mount said second jaw member on said shank for endwise movement toward and from the block-like clamping member, a swage arm carrier on said front end of the shank extending laterally therefrom alongside said yoke, a right angled swage arm pivoted at one end on said swage arm carrier for driving toward said anvil forming face, said other end of said arm providing an impact part for driving by a hammer and said arm having a swaging edge for driving a tooth of the saw against said anvil forming face, said swage arm carrier being tiltable on said shank into different set positions to vary the relation of said swaging edge to said anvil forming face.

2. A saw set comprising a carrier including an elongated flat sided shank terminating at one end in a hook-shaped yoke adapted to straddle a saw, a block-like clamping member secured to the terminal end of said yoke alongside the same, and having a flat end for engagement with one side of the saw, a second clamping member comprising a bar opposed to said shank parallel therewith and having a front end for engagement with the other side of the saw and an upper oblique anvil forming face at said end, means to slidably mount said second jaw member on said shank for endwise movement toward and from the block-like clamping member, a swage arm carrier on said front end of the shank extending laterally therefrom alongside said yoke, a right angled swage arm pivoted at one end on said swage arm carrier for driving toward said anvil forming face, said other end of said arm providing an impact part for driving by a hammer and said arm having a swaging edge for driving a tooth of the saw against said anvil forming face, said swage arm carrier being tiltable on said shank into different set positions to vary the relation of said swaging edge to said anvil forming face, and adjustable rebound limiting means for said swage arm mounted on said swage arm carrier.

DANIEL C. WEGNER.